United States Patent
He et al.

(10) Patent No.: US 11,963,220 B2
(45) Date of Patent: Apr. 16, 2024

(54) CHANNEL ACCESS MECHANISMS IN WIRELESS COMMUNICATION

(71) Applicant: Apple Inc., Cupertino, CA (US)

(72) Inventors: Hong He, Cupertino, CA (US); Dawei Zhang, Saratoga, CA (US); Wei Zeng, San Diego, CA (US); Chunhai Yao, Beijing (CN); Haitong Sun, Irvine, CA (US); Yuchul Kim, Santa Clara, CA (US); Yushu Zhang, Beijing (CN); Yang Tang, Cupertino, CA (US); Weidong Yang, San Diego, CA (US); Jie Cui, San Jose, CA (US); Oghenekome Oteri, San Diego, CA (US); Chunxuan Ye, San Diego, CA (US); Wei Zhang, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 71 days.

(21) Appl. No.: 17/053,718

(22) PCT Filed: Nov. 7, 2019

(86) PCT No.: PCT/CN2019/116264
§ 371 (c)(1),
(2) Date: Nov. 6, 2020

(87) PCT Pub. No.: WO2021/087866
PCT Pub. Date: May 14, 2021

(65) Prior Publication Data
US 2022/0279579 A1 Sep. 1, 2022

(51) Int. Cl.
*H04W 74/08* (2009.01)
*H04L 27/26* (2006.01)
(Continued)

(52) U.S. Cl.
CPC ..... *H04W 74/0816* (2013.01); *H04L 27/2607* (2013.01); *H04W 72/0446* (2013.01); *H04W 74/006* (2013.01); *H04W 74/0866* (2013.01)

(58) Field of Classification Search
CPC ......... H04W 74/0816; H04W 74/0866; H04W 74/006; H04W 72/0446; H04L 27/2607
(Continued)

(56) References Cited

U.S. PATENT DOCUMENTS

2017/0238342 A1* 8/2017 Yang ..................... H04W 16/14
370/329
2017/0244586 A1* 8/2017 Yoo ..................... H04L 27/2646
(Continued)

FOREIGN PATENT DOCUMENTS

CN 106559795 A 4/2017
CN 108702349 A 10/2018
(Continued)

OTHER PUBLICATIONS

Ericsson, R2-1910785, "Signaling options of LBT category for Msg3," 3GPP TSG RAN WG2 #107, 3GPP Sever (Aug. 15, 2019) (Year: 2019).*
(Continued)

*Primary Examiner* — Intekhaab A Siddiquee
(74) *Attorney, Agent, or Firm* — Kowert, Hood, Munyon, Rankin & Goetzel, P.C.

(57) ABSTRACT

Apparatuses, systems, and methods for selecting channel access mechanisms in wireless communications, and particularly in 3GPP NR-U. For example, an appropriate listen-before talk (LBT) channel access category (Cat) may be defined for certain messages, such as certain DL and/or UL control messages and certain RACH messages. For other messages, an appropriate Cat may be signaled by the base station, e.g., in a DCI message or SIB. Mechanisms are
(Continued)

provided for the base station to signal to the UE certain channel access profile parameters, such as an appropriate LBT Cat, CAPC, and/or CP extension. Mechanisms are also provided for adjustment of contention window duration.

18 Claims, 6 Drawing Sheets

(51) Int. Cl.
　　*H04W 72/0446*　　(2023.01)
　　*H04W 74/00*　　(2009.01)
　　*H04W 74/0816*　　(2024.01)

(58) Field of Classification Search
　　USPC .......................................................... 370/329
　　See application file for complete search history.

(56) References Cited

U.S. PATENT DOCUMENTS

| 2019/0281482 | A1 | 9/2019 | Yerramalli et al. |
| 2020/0053798 | A1* | 2/2020 | Tsai ..................... H04W 74/006 |
| 2020/0313946 | A1* | 10/2020 | Sun ..................... H04L 27/0006 |
| 2022/0150964 | A1* | 5/2022 | Babaei ................ H04W 72/042 |

FOREIGN PATENT DOCUMENTS

| GB | 2550200 A | * 11/2017 | ............ H04W 16/14 |
| GB | 2550200 A | 11/2017 | |
| JP | 2019-507537 | 3/2019 | |
| KR | 10-2018-0074689 A | 7/2018 | |
| KR | 10-2019-0030748 A | 3/2019 | |
| WO | 2019089125 A1 | 5/2019 | |

OTHER PUBLICATIONS 62716806P (Year: 2018).*
Preliminary Rejection for KR Patent Application No. 10-2020-7031848; dated Oct. 21, 2021.
Ericsson "Signaling options of LBT category for Msg3"; 3GPP TSG-RAN WG2 #107 R2-1910785; Prague, Czech Republic; Aug. 26-30, 2019.
International Search Report and Written Opinion for Application No. PCT/CN2019/116264, dated Nov. 7, 2019, 9 pages.
Extended European Search Report for EP Patent Application No. 19926736.0; dated Nov. 24, 2021.
Office Action for JP Patent Application No. 2022-526191; dated Apr. 27, 2023.
Ericsson "Channel access procedures"; 3GPP TSG-RAN WG1 Meeting #98Bis R1-1910947; Oct. 14, 2019.
Nokia et al. "Feature Lead's Summary on Channel Access Procedures"; 3GPP TSG RAN WG1 Meeting #98bis R1-1910592; Aug. 14, 2019.

* cited by examiner

CHANNEL ACCESS MECHANISMS IN WIRELESS COMMUNICATION

FIELD

The present application relates to wireless devices, and more particularly to apparatus, systems, and methods for selecting between available channel access mechanisms in wireless communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication.

Various methods have been developed for wireless communication technologies to negotiate channel access when performing wireless communications. Increasingly, cellular communications technologies, such as LTE-A and 5G NR, may operate in frequency ranges that have traditionally been used by non-cellular wireless communication technologies, such as Wi-Fi. As a result, when operating in these frequency ranges, cellular communications technologies should be adapted to efficiently negotiate channel access in ways that accommodate the preexisting channel negotiation procedures of the non-cellular technologies.

Accordingly, improvements in the field in support of such development and design are desired.

SUMMARY

Embodiments relate to apparatuses, systems, and methods for selecting channel access mechanisms in wireless communications. For example, an appropriate listen-before talk (LBT) channel access category (Cat) may be defined for certain messages, such as certain DL and/or UL control messages and certain RACH messages. For other messages, an appropriate Cat may be signaled by the base station, e.g., in a DCI message or SIB. Mechanisms are provided for the base station to signal to the UE certain channel access profile parameters, such as an appropriate LBT Cat, CAPC, and/or CP extension. Mechanisms are also provided for adjustment of contention window duration.

A wireless communication device is disclosed, comprising a memory storing software instructions and processor circuitry. The processor circuitry may be configured to implement the software instructions to cause the wireless communication device to receive, from a base station, a downlink control information (DCI) message including an indication of a listen-before-talk (LBT) category and an indication of cyclic prefix information. The software instructions may further cause the wireless communication device to perform an LBT procedure based on the LBT category, and, in response to successful completion of the LBT procedure, transmit a message having a cyclic prefix based on the cyclic prefix information.

In some scenarios, the indication of the LBT category may be included in a first information element (IE) of the DCI message, and the indication of the cyclic prefix information may be included in a second, different IE. In other scenarios, the indication of the LBT category and the indication of the cyclic prefix information may both be included in a single IE of the DCI message.

In some scenarios, the DCI message may also include an indication of a channel access priority class (CAPC), wherein the LBT procedure may be further based on the CAPC.

In some scenarios, the DCI message may also include an instruction for the wireless communication device to autonomously select a CAPC, wherein the processor circuitry may be further configured to implement the software instructions to cause the wireless communication device to select a CAPC in response to receiving the DCI message, wherein the LBT procedure may be further based on the selected CAPC.

A wireless communication device is disclosed, comprising a memory storing software instructions and processor circuitry. The processor circuitry may be configured to implement the software instructions to cause the wireless communication device to receive, from a base station, a first message granting an uplink transmission at a particular time, the first message including an indication of a listen-before-talk (LBT) category to be used for the uplink transmission. The processor circuitry may be configured to implement the software instructions to cause the wireless communication device to determine whether the particular time is within a channel occupancy time (COT) initiated by the base station. In response to determining that the particular time is not within the COT initiated by the base station, the wireless communication device may perform an LBT procedure defined by the LBT category indicated in the first message. In response to determining that the particular time is within the COT initiated by the base station, the wireless communication device may perform an LBT procedure defined by a second LBT category, other than the LBT category indicated in the first message. In response to successful completion of an LBT procedure, the wireless communication device may transmit the uplink transmission at the particular time.

In some scenarios, the processor circuitry may be further configured to implement the software instructions to cause the wireless communication device to receive, from the base station, a second message indicating timing information for the COT initiated by the base station, wherein determining whether the particular time is within the COT initiated by the base station is based on the timing information.

In some scenarios, the LBT procedure defined by the LBT category indicated in the first message may include a random back-off, wherein the LBT procedure defined by the second LBT category does not include a random back-off.

In some scenarios, the LBT procedure defined by the second LBT category may allow for transmission without performing a clear channel assessment.

In some scenarios, the first message may include a downlink channel information (DCI) message, wherein the indication of the LBT category may be included in a first information element (IE) of the first message, wherein a second IE of the first message may include an indication of cyclic prefix information for the uplink transmission. In some such scenarios, a third IE of the first message may include an indication of a channel access priority class (CAPC), wherein performing the LBT procedure defined by the LBT category indicated in the first message may include performing the LBT procedure as defined by the CAPC. In other such scenarios, a third IE of the first message may include an instruction for the wireless communication device to autonomously select a CAPC, wherein the processor circuitry may be further configured to implement the software instructions to cause the wireless communication device to select a CAPC in response to receiving the first message, wherein performing the LBT procedure defined by the LBT category indicated in the first message may include performing the LBT procedure as defined by the selected CAPC.

In some scenarios, the first message may include a downlink channel information (DCI) message, wherein a first information element (IE) of the first message may include the indication of the LBT category and an indication of cyclic prefix information for the uplink transmission.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Figure 1:
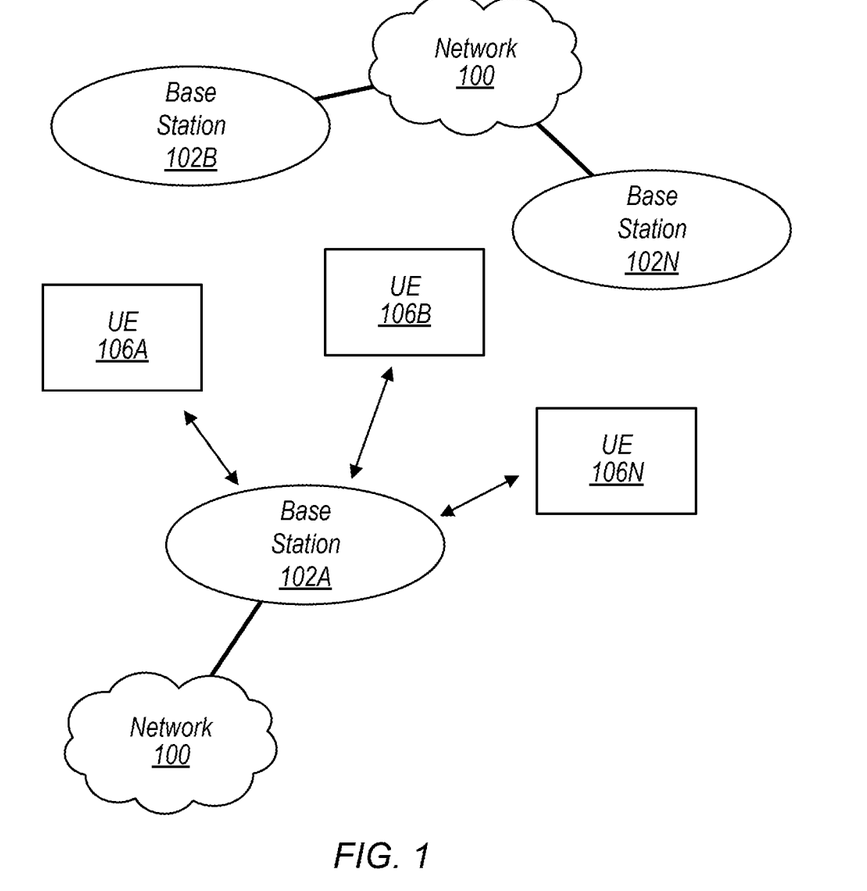
FIG. 1 illustrates an example wireless communication system, according to some embodiments.
Figure 2:
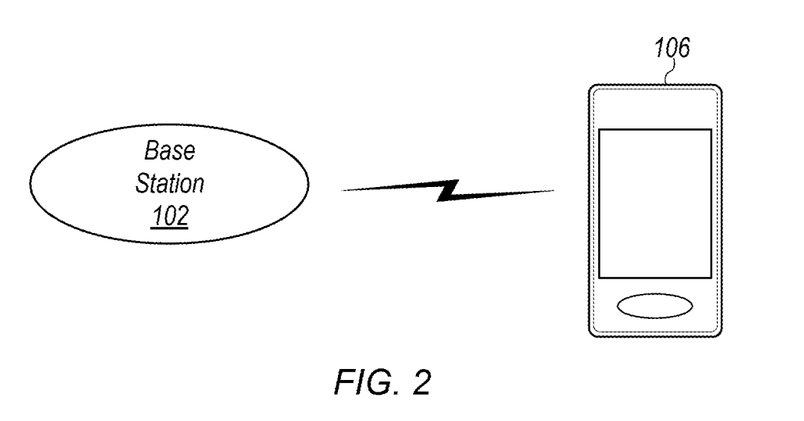
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1xRTT, 1xEV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1xRTT, 1xEV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1xRTT, or either of LTE or GSM, among various possibilities), and separate radios for communicating using each of Wi-Fi and Bluetooth. Other configurations are also possible.

Figure 3:
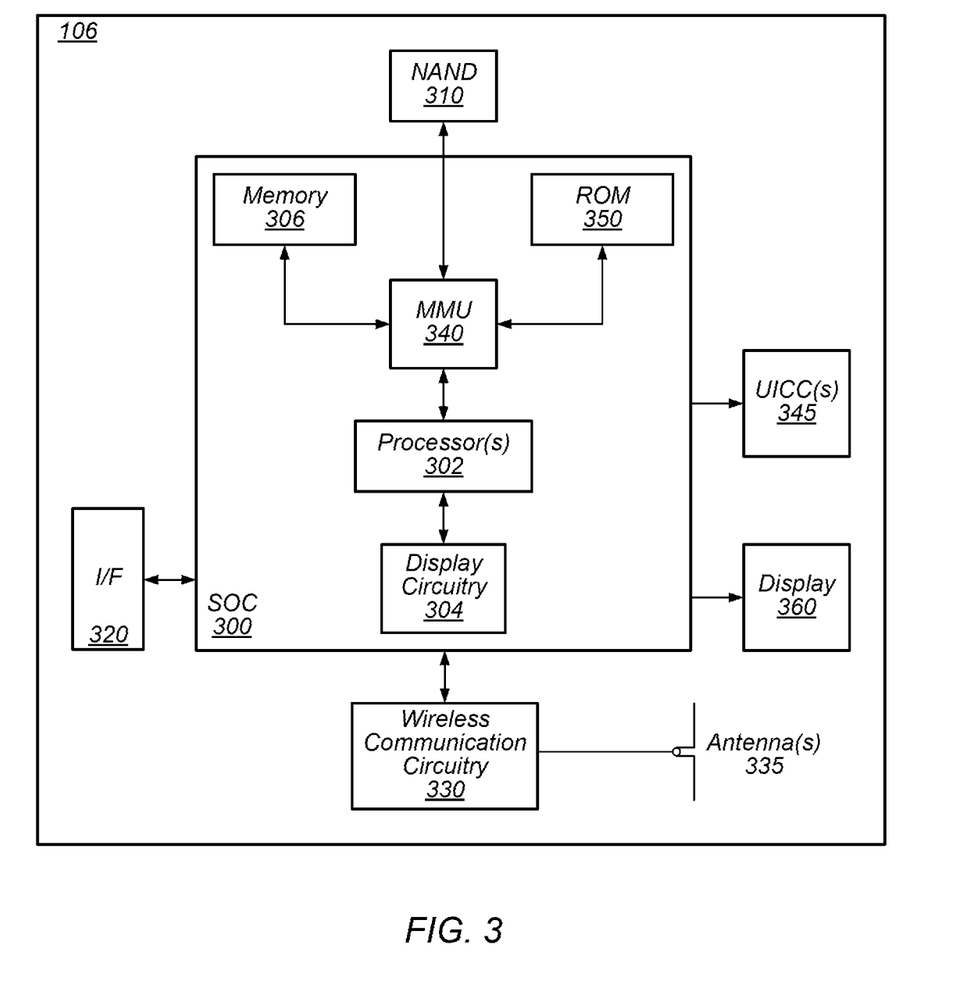
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface (I/F) 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
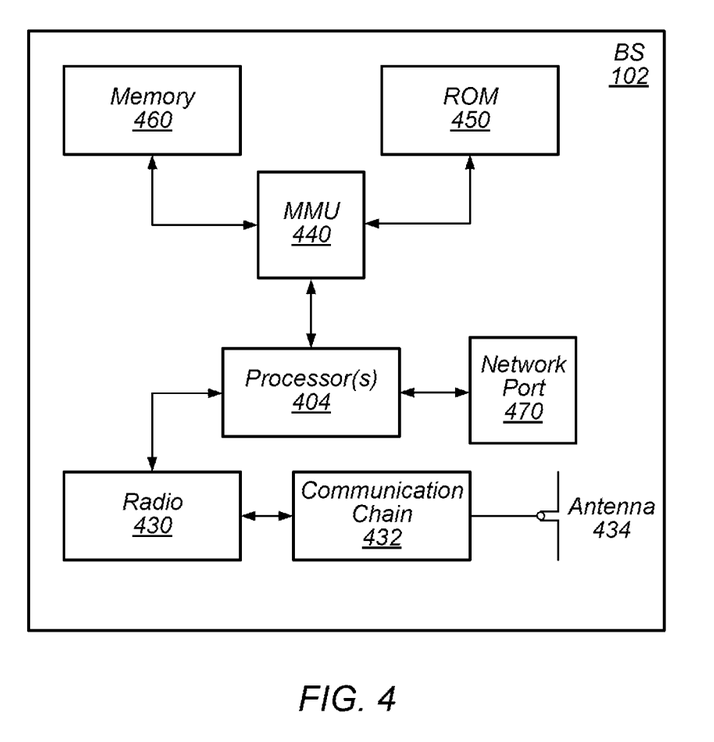
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Channel Access Category Selection

For some radio access technologies, multiple channel access categories may be defined for uplink (UL) and/or downlink (DL) transmission. For example, for 5G NR operating in unlicensed spectrum (NR-U), multiple channel access categories have been defined, including listen-before-talk (LBT) category 1 (Cat-1), Cat-2, and Cat-4. Cat-4 has been defined as LBT with exponential random back-off with a sensing duration of variable size, the sensing duration (also known as a contention window) being the length of time within which a clear channel assessment (CCA) is performed. Cat-2 has been defined as LBT without random back-off, in which the sensing duration is limited to either 16 us or 25 us. Cat-1 has been defined as allowing immediate transmission, e.g., without performing a CCA. One or more of the defined categories may include further variations. For example, Cat-4 has been defined to include four different options for channel access priority class (CAPC), which may be selected based on the priority of the data to be carried in the message.

When accessing the channel using an LBT procedure (e.g., initiating a channel occupancy time (COT)), a UE, such as the UE 106, may use various factors to determine which channel access category to use, and different factors may be used for different messages and/or channels. For example, different factors may be used for various DL or UL control channels and/or for RACH-related channels, such as PRACH/MSG-3 in 4-step RACH and/or MsgA in 2-step RACH.

As a first example, the UE 106 may use different LBT channel access categories for different uplink control messages. For example, when initiating a COT for certain types of UL control messages that are associated with a DL downlink control information (DCI) format, the UE 106 may use an LBT category indicated in the associated DCI, such as in a DCI 1_0 or DCI 1_1. Such types of UL control messages may include aperiodic sounding reference symbol (SRS) triggering or physical uplink control channel (PUCCH) messages that are associated with DL DCI, such as HARQ-ACK messages or aperiodic channel state information (CSI) reports. By contrast, when initiating a COT for an UL control message that is not associated with a DL DCI format, the UE 106 may use a specific predetermined LBT category, such as Cat-4 with the highest priority class (lowest value). Such messages may include certain types of PUCCH messages, such as a periodic CSI feedback over PUCCH, or a periodic SRS, for example.

As a second example, for a DL control channel transmission (e.g., a transmission that includes only DL control channel messages), the BS 102 may use an LBT category that is determined based on a selected CAPC value. In some scenarios, this may first include selection of CAPC by the base station 102. In other scenarios, the CAPC may be selected based on the DL traffic QoS requirement. For example, in 5G NR, different packet flows may be classified and marked with different quality of service (QoS) flow identifiers (QFI), and may be mapped to different 5G QoS indicator (5GI) values ranging from 1 to 85. The 5GI values may have a predefined one-to-one mapping to defined CAPC values. Therefore, the BS 102 may select a CAPC for channel access based on the 5GI associated with the packet flow on the PDSCH. In yet other scenarios, the CAPC may be selected based on a Buffer Status Report (BSR) (e.g., the most recent BSR). For example, when transmitting a DCI to schedule UL transmission, the BS 102 may select one CAPC value for channel access based on a recent/latest BSR status across different 5GI queues, which may be reported to the BS 102 by the UE 106.

As a third example, the UE 106 may use different LBT channel access categories for different channels in RACH procedures, such as for PRACH transmissions and RACH message-3 (Msg-3).

Specifically, in some implementations, the PRACH channel access category may be determined based at least in part on a device type of the UE 106, such as whether the UE 106 is operating as load based equipment (LBE) or frame based equipment (FBE). FBE equipment may seek to access the channel according to a defined frame structure, and may therefore perform CCA at a fixed time window within each frame period. If the channel is not available, the FBE device may remain quiet until the next frame period. By contrast, LBE devices may utilize a transmit/receive structure that is not fixed in time, but is instead demand-driven. An LBE device may perform CCA at need. If the channel is not available, the LBE device may perform an extended CCA, having an extended sensing duration. For PRACH procedures, FBE devices may use an LBT category indicated by the BS 102, e.g., in a system information block (SIB), such as SIB 1, or other appropriate message. Specifically, because FBE devices perform CCA within a fixed sensing duration, the BS 102 may, in some scenarios, select an LBT category for FBE PRACH procedures that is more aggressive than Cat-4. By contrast, LBE devices may be limited to using a particular, less-aggressive LBT category (e.g., Cat-4 with the highest priority class) for PRACH transmission. For contention-free RACH procedures, such LBE devices may also use an LBT category indicated by the BS 102, e.g., in a corresponding DCI 1_0 or other appropriate message.

Additionally, or alternatively, the LBT category for Msg-3 in the RACH procedure may be determined based at least in part on whether the Msg-3 is to be multiplexed with another MAC-PDU. Specifically, the UE 106 may commonly multiplex multiple MAC-PDUs together prior to transmission, if multiple MAC-PDUs are available for transmission. When initiating a COT to transmit a RACH Msg-3, the UE 106 may be limited to using a particular, less-aggressive LBT category (e.g., LBT Cat-4) if the UE 106 does not have another MAC-PDU to multiplex together with the Msg-3. However, if the UE 106 does multiplex one or more other MAC-PDU(s) together with the Msg-3, then the UE 106 may select a LBT category based on those other MAC-PDU(s). For example, the UE 106 may select a more aggressive category (e.g., Cat-2 or Cat-1), if the UE 102 would select (e.g., is allowed to use) the more aggressive category to initiate a COT for the other MAC-PDU(s).

Alternatively, the LBT category for Msg-3 maybe signaled by the BS 102. For example, the LBT category for Msg-3 may be indicated in DCI 1_0 scrambled with a random access radio network temporary identifier (RA-RNTI) carrying the DL assignment for reception of the RACH response (RAR) messages (e.g., Msg-2). As another example, the LBT category for Msg-3 may be included in the payload of a RAR MAC-PDU, such as in an UL grant in the RAR MAC-PDU.

Signaling Mechanism for UL Transmissions

In NR-U, either a UE, such as the UE 106, or a BS, such as the BS 102 may initiate a COT, in various scenarios. Once a COT has been initiated, the transmitting device may transmit one or more transmissions (e.g., bursts) within the COT, the bursts separated by gaps during which the transmitting device is not transmitting. Gaps having specific durations may be created, e.g., using one or more of timing advance, cyclic prefix (CP) extension, or shortening of DL or UL transmission duration by one or more OFDM symbols.

In some scenarios, a COT may be shared with another device. For example, a BS-initiated COT may include (e.g., begin with) a DL transmission that includes an UL grant for a time later in the same COT. In response, the UE 106 may transmit an UL transmission at the specified time in the COT.

As noted previously, NR-U supports multiple categories of LBT (e.g., Cat 1, Cat-2, 25 us Cat-2, Cat-4). In some scenarios, the category of LBT to use may depend, at least in part, on the gap duration between transmissions. For example, in some scenarios, the UE 106 may use Cat-1 (i.e., no LBT) to transmit within a BS-initiated COT if the gap following the end of the preceding transmission is no more than 16 us, but may use Cat-2 if the gap is 16 us or 25 us. However, in some cases, the UE 106 may not be aware of the COT structure (e.g. whether a scheduled/granted transmission is within a BS-initiated COT) or the gap durations (e.g., 16 us, 25 us, or even larger). This may limit the ability of the UE 106 to determine the LBT type.

To ensure that the UE 106 remains aligned with the BS 102, the BS 102 may indicate various channel access profile parameters to the UE 106. Such signaling may be performed in various ways, with tradeoffs between signaling flexibility and signaling overhead.

As one example, LBT category, CP extension configurations, and CAPC may be signaled in a single uplink scheduling DCI using separate information element (IE) fields.

LBT category: In some implementations, a 2-bit information element (IE) field may be included within the DCI, the IE field having different states having a one-to-one association with different LBT categories. For example, value '00' may indicate 'Cat-1', value '01' may indicate 'Cat-2 with 16 us sensing gap', value '10' may indicate 'Cat-2 with 25 us sensing gap', and value '11' may indicate 'Cat-4'. In some implementations, the size of the LBT category field may be configurable depending on category types enabled by the network.

CP Extension (CPE): In some implementations, a 2-bit IE field may be used to indicate CPE, e.g., as shown in Table 1.

TABLE 1

| 2-bit CPE | CP Extension Configuration |
| --- | --- |
| 00 | No CP extension |
| 01 | Configuration 1 (e.g., C1*symbol length-25 us, where C1 depends on Subcarrier spacing) |
| 10 | Configuration 2 (e.g., C2*symbol length-16 us-Timing Advance value, where C2 depends on Subcarrier spacing) |
| 11 | Configuration 3 (e.g., C3*symbol length-25 us-Timing Advance value, where C3 depends on Subcarrier spacing) |

In some implementations, the field size can be further reduced to 1 bit in case a subset of rows in Table 1 are configured for a UE using RRC signaling. For example, for a given subcarrier spacing (e.g., 15 kHz), RRC signaling may narrow the selections to just the first two rows shown in Table. Thus, the two available options may be indicated with a 1-bit IE.

Channel Access Priority Class (CAPC): In some implementations, a 2-bit IE field may be used to indicate one of the four available values (e.g., '1,2,3,4').

In some scenarios, signaling overhead may be reduced based on known conditions. For example, during a BS-initiated COT, the UE 106 may use only Cat-1 or Cat-2 with 16 us sensing gap. Thus, signaling for a grant within a BS-initiated COT may omit an explicit indication of the category. Instead of relying on an explicit indication, the UE 106 may determine the category based on the gap duration of scheduled UL transmissions. For example, once the UE 106 detects the occurrence of a BS-initiated COT, the UE 106 may use Cat-1 within the COT if the gap duration<X (e.g., 16 us), and may otherwise use Cat- 2 with 16 us duration.

As another example, to reduce signaling overhead in DCI, a joint coding scheme for LBT category, CP Extension, and CAPC may be used, e.g., as shown in Table 2.

TABLE 2

| Signal Value | LBT Category | CP Extension | CAPC |
| --- | --- | --- | --- |
| 0000 | Cat-1 | 0 | None |
| 0001 | Cat-2 with 16 us sensing gap | 0 | None |
| 0010 | Cat-2 with 16 us sensing gap | 1 | None |
| 0011 | Cat-2 with 16 us sensing gap | 2 | None |
| 0100 | Cat-2 with 16 us sensing gap | 3 | None |
| 0101 | Cat-2 with 25 us sensing gap | 0 | None |
| 0110 | Cat-2 with 25 us sensing gap | 1 | None |
| 0111 | Cat-2 with 25 us sensing gap | 2 | None |
| 1000 | Cat-2 with 25 us sensing gap | 3 | None |
| 1001 | Cat-4 | 0 (without CP extension) | 1 |
| 1010 | Cat-4 | 0 (without CP extension) | 2 |
| 1011 | Cat-4 | 0 (without CP extension) | 3 |
| 1100 | Cat-4 | 0 (without CP extension) | 4 |
| 1101-1111 | Reserved | | |

In some implementations, an additional value of the CAPC IE field (e.g., in addition to '1,2,3,4') may be used to indicate that the UE 106 should autonomously select the CAPC value. For example, this may allow the UE 106 to select the CAPC based, e.g., on the buffer status and/or traffic type at the UE side, which are unknown to the BS 102. For example, in response to determining that the buffer includes a large amount of data, then the UE 106 may select a higher-priority class than it would select if the buffer included a smaller amount of data. Similarly, in response to determining that UL traffic is of a type that is not delay-tolerant, then the UE 106 may select a higher-priority class than it would select for a more delay-tolerant traffic type.

Figure 5:
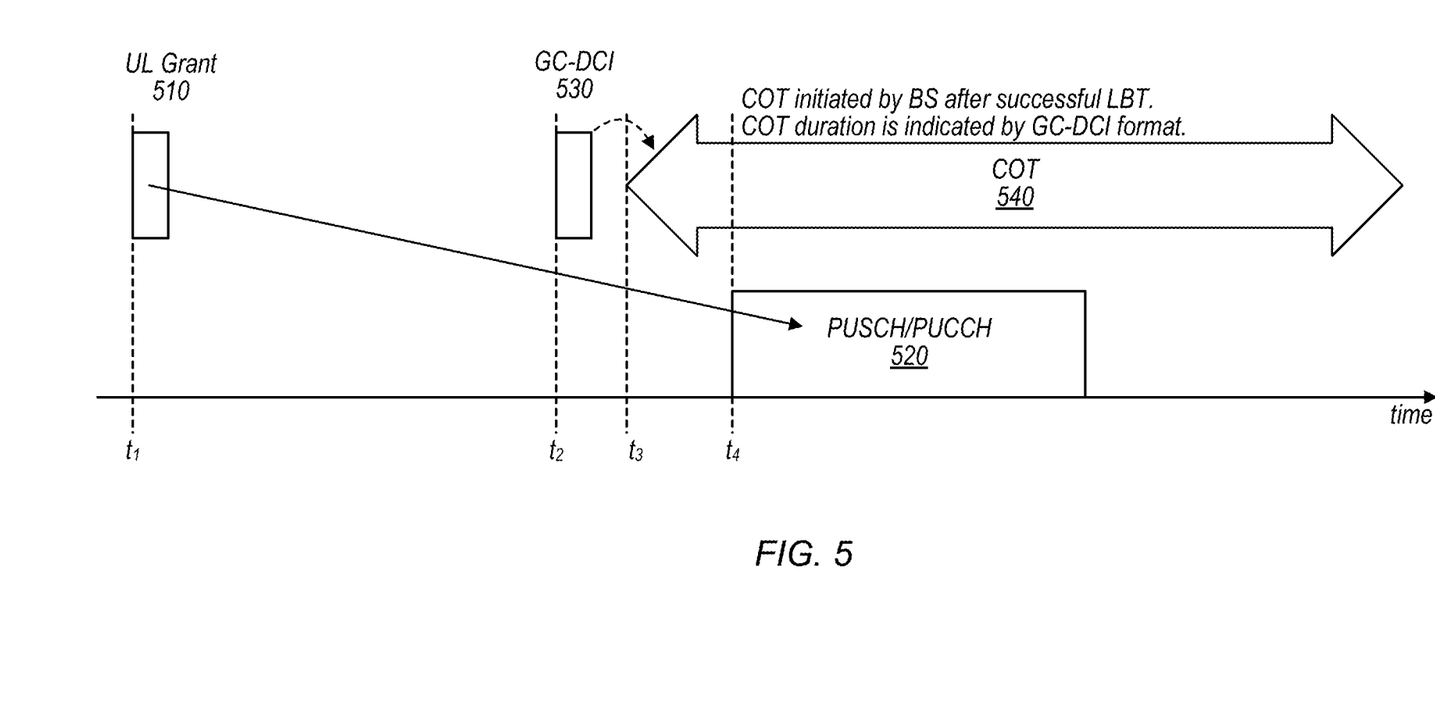
FIG. 5 illustrates an example timing diagram for a procedure for overriding category selection for uplink transmissions, according to some embodiments.

In some implementations, the UE 106 may be configured to use an LBT category other than the category indicated by the BS 102, in some scenarios. FIG. 5 illustrates one such scenario.

As illustrated, the BS 102 may transmit to the UE 106 an UL grant 510 at a first time, $t_1$. For example, the UL grant 510 may be included in an UL grant DCI (e.g., DCI format 0). The UL grant 510 may grant an UL transmission 520 at a later time, $t_4$. In some scenarios, the UL transmission 520 may include a PUSCH and/or PUCCH. The UL grant 510 (or the DCI in which it is included) may include an indication of a first LBT category for use by the UE 102 when performing the UL transmission 520, e.g., according to any of the foregoing examples. For example, the UL grant 510 may indicate that the UE 102 should use Cat-4 when performing the UL transmission 520.

At a second time, $t_2$, the BS 106 may transmit to the UE 106 a DCI 530 (e.g., a group-common DCI (GC-DCI)), which may include sharing information and/or timing information for an upcoming BS-initiated COT 540. For example, the DCI 530 may include sharing information indicating that UL transmissions are allowed in the COT 540. The BS 120 may initiate the COT 540 following the DCI 530, at a time $t_3$.

In response to receiving the DCI 530, the UE 160 may determine that the sharing information indicates that UL transmissions are allowed in the COT 540, and/or that the granted UL transmission 520 is scheduled within the COT 540. In response, the UE 160 may autonomously determine to use an LBT category other than that indicated by the UL grant 510. For example, in response to determining that the UL transmission 520 will occur within the BS-initiated COT 540, the UE may use LBT Cat-1 or Cat-2 (e.g., with either a 16 us or 25 us sensing duration) for the UL transmission 520. After satisfying the LBT procedure according to the selected category, the UE 160 may transmit the UL transmission 520.

In other scenarios, the UE 160 may determine that the UL transmission 520 will not occur within a B S-initiated COT (or not occur within any COT). In response, the UE 160 may transmit the UL transmission 520 using the LBT category indicated by the UL grant 510.

It should be understood that the scenario of FIG. 5 is one example, and in other scenarios the UE 160 may determine to transmit an UL transmission using an LBT category other than the category indicated by the BS 102 based on other factors, e.g., not related to whether the UL transmission will occur within a COT.

Contention Window Adjustment

As noted previously, some LBT procedures (e.g., NR-U LBT Cat-4) may utilize a sensing duration (or contention window) of variable size. In some implementations, the sensing duration may be adjusted in various ways.

As a first example, the contention window may be adjusted based on a HARQ-ACK ratio Z. For example, in some implementations, if Z exceeds a certain predefined threshold (e.g., 80%), then the contention window may be increased to the next higher allowed value. Otherwise, the contention window may remain the same.

However, NR-U may support code block group (CBG)-based transmission, in which a transport block (TB) may be divided into a plurality of groups of code blocks, with an ACK/NACK reported for each CBG. This allows lower retransmission rates, as each CBG may be considered individually for retransmission, rather than requiring the entire TB to be retransmitted if a portion is not received. However, Z represents the HARQ-ACK ratio of the entire TB, rather than individual CBGs. Therefore, Z may be calculated based on a virtual TB-level HARQ-ACK (V-T-HARQ-ACK).

Figure 6A:
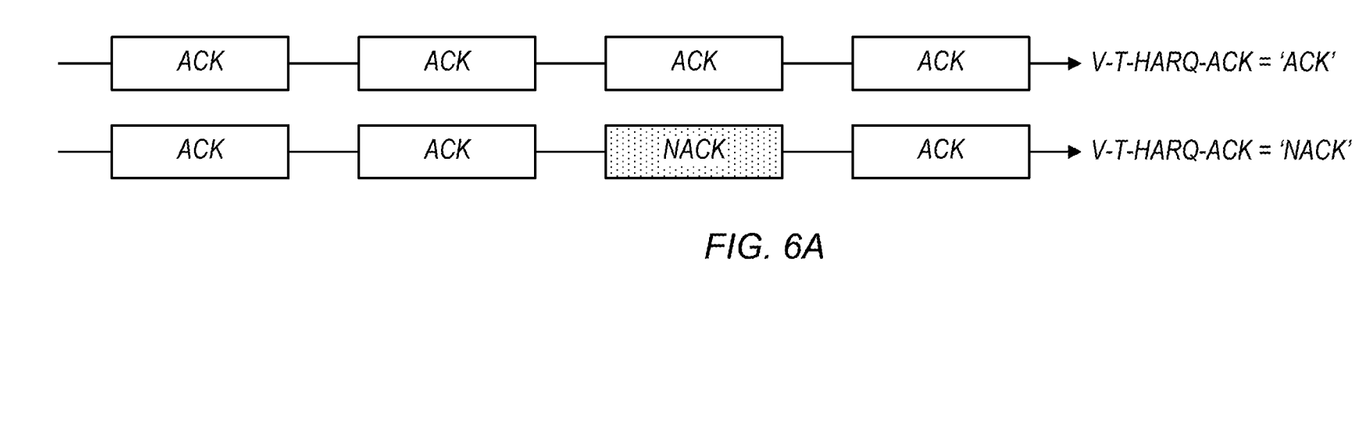
FIGS. 6A and 6B illustrate example procedures for calculating a virtual-TB-HARQ-ACK for code block group (CBG)-based transmission, according to some embodiments.

A first example of calculating Z based on a V-T-HARQ-ACK is illustrated in FIG. 6A. As illustrated, HARQ-ACK values may be obtained for a plurality of CBGs of a single PDSCH transmission, and a logical AND operation of all the corresponding individual HARQ-ACKs is performed to generate the V-T-HARQ-ACK. As illustrated in FIG. 6A, this results in V-T-HARQ-ACK=ACK if an ACK is received for every CBG in the plurality of CBGs, and V-T-HARQ-ACK=NACK if an ACK is not received (e.g., if a NACK is received) for any CBG. In other implementations, a logical OR operation of all the corresponding individual HARQ-ACKs is performed to generate the V-T-HARQ-ACK. This results in V-T-HARQ-ACK=ACK if an ACK is received from any CBG in the plurality of CBGs, and V-T-HARQ-ACK=NACK only if an ACK is not received for any CBG. In either case, the V-T-HARQ-ACK may be treated as a single HARQ-ACK for calculating a value of Z.

Figure 6B:
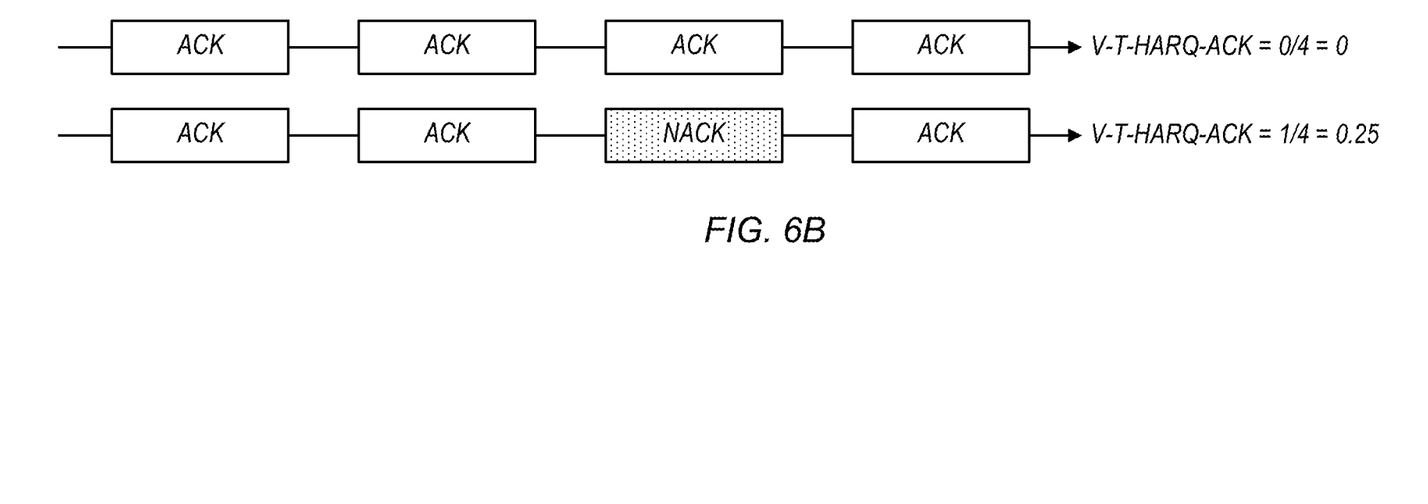

A second example of calculating Z based on a V-T-HARQ-ACK is illustrated in FIG. 6B. As in FIG. 6A, HARQ-ACK values may be obtained for a plurality of CBGs of a single PDSCH transmission. However, in FIG. 6B, V-T-HARQ-ACK may be set to a fractional value calculated as the ratio of NACKs to the total number of CBGs in the plurality of CBGs (e.g., the total number of CBGs in the PDSCH transmission). As illustrated in FIG. 6B, if an ACK is received for each CBG in a set of four CBGs, then V-T-HARQ-ACK=0/4=0. However, if an ACK is not received (e.g., if a NACK is received) for one of the CBGs, then V-T-HARQ-ACK=¼=0.25. The fractional value of V-T-HARQ-ACK may be treated as a single HARQ-ACK for calculating a value of Z.

Figure 7:
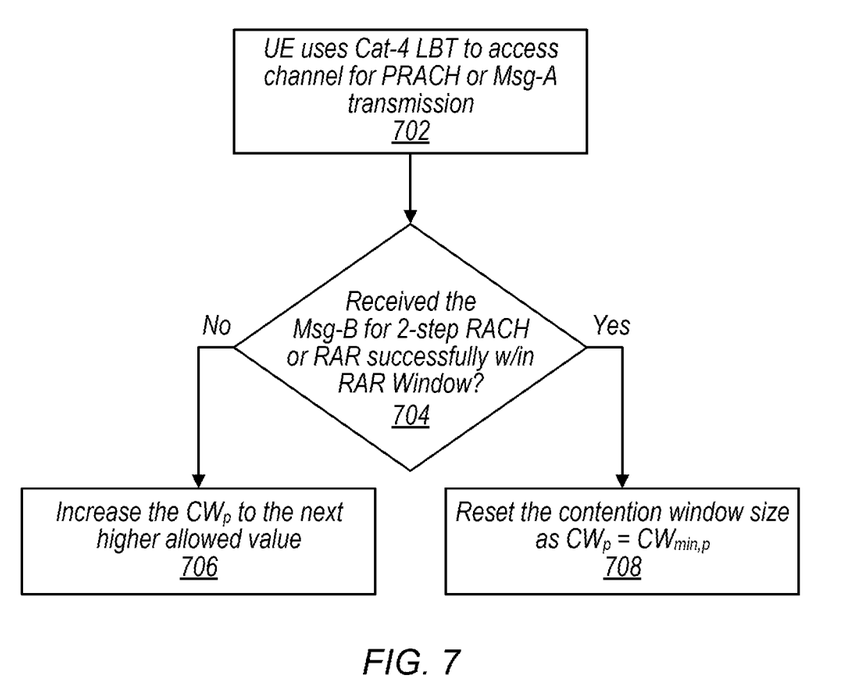
FIG. 7 illustrates a flow diagram for an example method for adjusting a contention window in a RACH, according to some embodiments.

As a second example of adjusting the contention window, in some implementations, the contention window for UL transmissions in 2-step or 4-step RACH procedures may be dynamically adjusted for a given priority class. As noted previously, LBT Cat-4 may utilize any of four channel access priority classes (CAPCs). FIG. 7 illustrates an example method of adjusting the contention window. The method of FIG. 7 may be performed by a UE, such as the UE 106, or by some portion thereof, such as the wireless communication circuitry 330.

At 702, the UE 106 may use Cat-4 LBT to access the channel for either PRACH or Msg-A transmission.

At 702, the UE 106 may determine whether it has received an appropriate response within a defined window. For example, for 2-step RACH procedure, the UE 106 may determine whether it has successfully received from the BS 102 a Msg-B within a predefined RAR window. As another example, for 4-step RACH procedure, the UE 106 may determine whether it has successfully received from the BS 102 a RAR or Msg-4 within the RAR window.

In response to determining, at 704 that the appropriate response was not received within the defined window, the UE 106 may, at 706, increase the contention window, $CW_p$, for the corresponding priority class p, to the next higher allowed value.

In response to determining, at 704 that the appropriate response was received within the defined window, the UE 106 may, at 708, reset $CW_p$ to a minimum value $CW_{min,p}$.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or BS 102, or some component thereof, such as the wireless communication circuitry 330 or the modem 520) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless communication device, comprising:
a memory storing software instructions;
processor circuitry configured to implement the software instructions to cause the wireless communication device to:
receive, from a base station, a downlink control information (DCI) message including an indication of a first listen-before-talk (LBT) category and an indication of cyclic prefix information;
receive, from the base station, a second message indicating timing information for a channel occupancy time (COT) initiated by the base station after receiving the DCI message;
perform an LBT procedure based on an LBT category other than the first LBT category in response to determining, based on the timing information, that the particular time is within the COT;
perform an LBT procedure based on the first LBT category in response to determining, based on the timing information, that a particular time granted for uplink transmission is not within the COT; and
in response to successful completion of the LBT procedure, transmit a message having a cyclic prefix based on the cyclic prefix information.

2. The wireless communication device of claim 1, wherein the indication of the LBT category is included in a first information element (IE) of the DCI message, and the indication of the cyclic prefix information is included in a second, different IE.

3. The wireless communication device of claim 1, wherein the indication of the LBT category and the indication of the cyclic prefix information are both included in a single information element (IE) of the DCI message.

4. The wireless communication device of claim 1, wherein the DCI message also includes an indication of a channel access priority class (CAPC), wherein the LBT procedure is further based on the CAPC.

5. The wireless communication device of claim 1, wherein the DCI message also includes an instruction for the wireless communication device to autonomously select a channel access priority class (CAPC), wherein the processor circuitry is further configured to implement the software instructions to cause the wireless communication device to:
select a CAPC in response to receiving the DCI message, wherein the LBT procedure is further based on the selected CAPC.

6. A wireless communication device, comprising:
a memory storing software instructions;
processor circuitry configured to implement the software instructions to cause the wireless communication device to:
receive, from a base station, a first message granting an uplink transmission at a particular time, the first message including an indication of a listen-before-talk (LBT) category to be used for the uplink transmission;
receive, from the base station, after receiving the first message, a second message indicating timing information for a channel occupancy time (COT) initiated by the base station;
determine whether the particular time is within the COT initiated by the base station, based on the timing information;
in response to determining that the particular time is not within the COT initiated by the base station, perform an LBT procedure defined by the LBT category indicated in the first message;
in response to determining that the particular time is within the COT initiated by the base station, perform an LBT procedure defined by a second LBT category, other than the LBT category indicated in the first message; and
in response to successful completion of an LBT procedure, transmit the uplink transmission at the particular time.

7. The wireless communication device of claim 6, wherein the LBT procedure defined by the LBT category indicated in the first message includes a random back-off, wherein the LBT procedure defined by the second LBT category does not include a random back-off.

8. The wireless communication device of claim 6, wherein the LBT procedure defined by the second LBT category allows for transmission without performing a clear channel assessment.

9. The wireless communication device of claim 6, wherein the first message includes a downlink channel information (DCI) message, wherein the indication of the LBT category is included in a first information element (IE) of the first message, wherein a second IE of the first message includes an indication of cyclic prefix information for the uplink transmission.

10. The wireless communication device of claim 9, wherein a third IE of the first message includes an indication of a channel access priority class (CAPC), wherein performing the LBT procedure defined by the LBT category indicated in the first message comprises performing the LBT procedure as defined by the CAPC.

11. The wireless communication device of claim 9, wherein a third IE of the first message includes an instruction for the wireless communication device to autonomously select a channel access priority class (CAPC), wherein the processor circuitry is further configured to implement the software instructions to cause the wireless communication device to:
select a CAPC in response to receiving the first message, wherein performing the LBT procedure defined by the LBT category indicated in the first message comprises performing the LBT procedure as defined by the selected CAPC.

12. The wireless communication device of claim 6, wherein the first message includes a downlink channel information (DCI) message, wherein a first information element (IE) of the first message includes the indication of the LBT category and an indication of cyclic prefix information for the uplink transmission.

13. A non-transitory computer-readable medium storing software instructions configured to, when executed by a processor of a wireless communication device, cause the wireless communication device to:
receive, from a base station, a first message granting an uplink transmission at a particular time, the first message including an indication of a listen-before-talk (LBT) category to be used for the uplink transmission;
determine whether the particular time is within a channel occupancy time (COT) initiated by the base station;
in response to determining that the particular time is not within the COT initiated by the base station, perform an LBT procedure defined by the LBT category indicated in the first message;
in response to determining that the particular time is within the COT initiated by the base station, perform an LBT procedure defined by a second LBT category, other than the LBT category indicated in the first message;

in response to successful completion of an LBT procedure, transmit the uplink transmission at the particular time; and receive, from the base station, a second message indicating timing information for the COT initiated by the base station, wherein determining whether the particular time is within the COT initiated by the base station is based on the timing information.

14. The non-transitory computer-readable medium of claim 13, wherein the LBT procedure defined by the LBT category indicated in the first message includes a random back-off, wherein the LBT procedure defined by the second LBT category does not include a random back-off.

15. The non-transitory computer-readable medium of claim 13, wherein the LBT procedure defined by the second LBT category allows for transmission without performing a clear channel assessment.

16. The non-transitory computer-readable medium of claim 13, wherein the first message includes a downlink channel information (DCI) message, wherein the indication of the LBT category is included in a first information element (IE) of the first message, wherein a second IE of the first message includes an indication of cyclic prefix information for the uplink transmission.

17. The non-transitory computer-readable medium of claim 16, wherein a third IE of the first message includes an indication of a channel access priority class (CAPC), wherein performing the LBT procedure defined by the LBT category indicated in the first message comprises performing the LBT procedure as defined by the CAPC.

18. The non-transitory computer-readable medium of claim 16, wherein a third IE of the first message includes an instruction for the wireless communication device to autonomously select a channel access priority class (CAPC), wherein the software instructions are further configured to cause the wireless communication device to:

select a CAPC in response to receiving the first message, wherein performing the LBT procedure defined by the LBT category indicated in the first message comprises performing the LBT procedure as defined by the selected CAPC.

* * * * *

UNITED STATES PATENT AND TRADEMARK OFFICE
CERTIFICATE OF CORRECTION

| | | |
|---|---|---|
| PATENT NO. | : 11,963,220 B2 | |
| APPLICATION NO. | : 17/053718 | |
| DATED | : April 16, 2024 | |
| INVENTOR(S) | : Hong He et al. | |

It is certified that error appears in the above-identified patent and that said Letters Patent is hereby corrected as shown below:

In the Claims

Column 19, Line 18, in Claim 1, delete "the particular time;" and insert --a particular time granted for uplink transmission--.

Signed and Sealed this
Ninth Day of July, 2024

Katherine Kelly Vidal
*Director of the United States Patent and Trademark Office*